(12) United States Patent
Suzumura et al.

(10) Patent No.: US 8,155,204 B2
(45) Date of Patent: Apr. 10, 2012

(54) IMAGE DECODING APPARATUS AND IMAGE DECODING METHOD

(75) Inventors: Tatsuhiro Suzumura, Kawasaki (JP);
Shuji Michinaka, Kawasaki (JP);
Kiwamu Watanabe, Kawasaki (JP);
Masashi Jobashi, Kawasaki (JP);
Takaya Ogawa, Kawasaki (JP);
Hiromitsu Nakayama, Kawasaki (JP);
Satoshi Takekawa, Kawasaki (JP);
Yoshinori Shigeta, Kawasaki (JP);
Akihiro Oue, Palo Alto, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 1191 days.

(21) Appl. No.: 11/857,874

(22) Filed: Sep. 19, 2007

(65) Prior Publication Data
US 2008/0137754 A1 Jun. 12, 2008

(30) Foreign Application Priority Data

Sep. 20, 2006 (JP) ................................. 2006-254142

(51) Int. Cl.
*H04N 11/02* (2006.01)
(52) U.S. Cl. .............. 375/240.24; 375/240; 375/240.25; 375/240.26; 375/240.27; 375/240.28
(58) Field of Classification Search .................. 375/240, 375/240.24, 240.25, 240.26, 240.27, 240.28; 370/458, 468, 537; 348/39, 423.1, 441
See application file for complete search history.

(56) References Cited

U.S. PATENT DOCUMENTS

| 5,850,483 | A | * | 12/1998 | Takabatake et al. | .......... 382/233 |
| 5,903,282 | A | * | 5/1999 | Schoner et al. | .............. 345/558 |
| 5,910,824 | A | * | 6/1999 | Yu | .................. 348/714 |
| 6,008,849 | A | * | 12/1999 | Frencken | ................. 375/240.12 |
| 6,075,899 | A | * | 6/2000 | Yoshioka et al. | ............. 382/233 |

(Continued)

FOREIGN PATENT DOCUMENTS

JP 2001-61150 3/2001

(Continued)

OTHER PUBLICATIONS

Japanese Office Action issued Sep. 7, 2010, in Patent Application No. 2006-254142 (with English-language translation).

*Primary Examiner* — Ayaz Sheikh
*Assistant Examiner* — Andrew C Lee
(74) *Attorney, Agent, or Firm* — Oblon, Spivak, McClelland, Maier & Neustadt, L.L.P.

(57) ABSTRACT

The image decoding apparatus and the image decoding method according to one aspect of the present invention have a configuration for storing an image decoded in the past as a reference picture into a frame memory, in a field structure in which top lines in the reference picture are stored in a top area and bottom lines in the reference picture are stored in a bottom area, in order to use a part of the image decoded in the past as a reference block in a picture being presently decoded; and selectively copying and storing an uppermost top line or an uppermost bottom line in the reference picture to areas on the uppermost top line and the uppermost bottom line in the reference picture in the top area and the bottom area in the frame memory, and selectively copying and storing a lowermost top line or a lowermost bottom line in the reference picture to areas under the lowermost top line and the lowermost bottom line in the reference picture in the top area and the bottom area in the frame memory.

19 Claims, 5 Drawing Sheets

U.S. PATENT DOCUMENTS

| | | | |
|---|---|---|---|
| 6,768,774 B1* | 7/2004 | MacInnis et al. | 375/240.15 |
| 6,996,178 B1* | 2/2006 | Zhang et al. | 375/240.16 |
| 7,924,925 B2* | 4/2011 | He | 375/240.24 |
| 2003/0099293 A1* | 5/2003 | Okada et al. | 375/240.13 |
| 2003/0133506 A1* | 7/2003 | Haneda | 375/240.25 |
| 2004/0061704 A1* | 4/2004 | Ju et al. | 345/564 |
| 2004/0233990 A1* | 11/2004 | Sekiguchi et al. | 375/240.16 |
| 2005/0169378 A1* | 8/2005 | Kim et al. | 375/240.16 |
| 2005/0175100 A1 | 8/2005 | Yamane et al. | |
| 2005/0195902 A1* | 9/2005 | Chung | 375/240.25 |
| 2006/0023788 A1* | 2/2006 | Otsuka et al. | 375/240.16 |
| 2006/0291568 A1* | 12/2006 | Suzumura et al. | 375/240.24 |
| 2010/0215093 A1* | 8/2010 | Schlockermann et al. | 375/240.01 |

FOREIGN PATENT DOCUMENTS

| | | |
|---|---|---|
| JP | 2005-65239 | 3/2005 |
| JP | 2005-223631 | 8/2005 |
| WO | WO 2005/034516 A1 | 4/2005 |

* cited by examiner

IMAGE DECODING APPARATUS AND IMAGE DECODING METHOD

CROSS REFERENCE TO RELATED APPLICATION

This application is based upon and claims the benefit of priority from the prior Japanese Patent Application No. 2006-254142, filed on Sep. 20, 2006; the entire contents of which are incorporated herein by reference.

BACKGROUND OF THE INVENTION

1. Field of the Invention

The present invention relates to an image decoding apparatus and an image decoding method.

2. Related Background Art

In an image decoding process, there is a case that a part of an image decoded in the past is used as a reference block to generate predictive image data, and the predictive image data is used for a picture being decoded at present.

A reference picture which is an image decoded in the past and is referred to is stored in a frame memory as a predetermined storage area on a storage device such as an SDRAM. The reference block is a part of the reference picture stored in the frame memory.

The reference block is defined in the reference picture by using motion vector information indicative of the positional relation between a picture being decoded at present and the reference picture, and is read. In some cases, however, the reference block is an area partly or entirely off from the proper reference picture area.

In such a case, image data is compensated by using a method called "padding". After that, by performing a normal interpolating operation, a reference block is formed.

The padding is a method of copying each of the uppermost line, the lowermost line, the right end line, and the left end line of a reference picture, and adding the copied lines to peripheral areas of the reference picture to extend the reference picture to an area including the reference block, thereby enabling the reference block to be defined and read.

On the other hand, depending on the kind of a macro block being decoded at present, there is a case that a reference block has to be formed only by top lines or bottom lines.

In the case where the reference picture is stored in a frame structure in a frame memory, the reference picture on the frame memory has a structure in which top lines and bottom lines are alternately arranged. When the reference picture is stored in a field structure in a frame memory, the reference picture on the frame memory has a structure in which top lines (even-numbered lines) in a top area and bottom lines (odd-numbered lines) in a bottom area are arranged separately from each other.

Assuming the case where the reference block is constructed only by the top lines or only the bottom lines, by storing a reference picture as an image having the field structure on the frame memory, image data in either the top area or the bottom area can be read sufficiently. Therefore, it is effective in view of reduction in the amount of read data.

A data processing apparatus capable of generating predictive image data in short time even in the case where a motion vector indicates an area out of a valid pixel area in a reference picture has been proposed and known. The configuration of the data processing apparatus is employed on condition that a reference picture is stored in the frame structure (refer to, for example, Japanese Patent Application Laid-Open (JP-A) No. 2005-223631).

Pictures used as reference pictures may undergo different padding methods on the picture unit basis. Specifically, there are roughly two picture padding methods. In a first method, only the uppermost line and the lowermost line of a picture are padded on the uppermost and under the lowermost lines, respectively, of the picture (hereinbelow, called "I-line padding"). In a second method, two lines (the uppermost top line and the uppermost bottom line) from the upper end of a picture are alternately padded to areas on the picture, and two lines (the lowermost top line and the lowermost bottom line) from the bottom end of the picture are alternately padded to areas under the picture (hereinbelow, called "2-line padding").

The uppermost top line is the uppermost line of the top lines in a reference picture, the uppermost bottom line is the uppermost line of the bottom lines in the reference picture, the lowermost top line is the lowermost line of the top lines in the reference picture, and the lowermost bottom line is the lowermost line of the bottom lines in the reference picture.

As described above, when the reference picture is stored as an image having a field structure on the frame memory, the amount of read data may be reduced and it is advantageous.

In this case, however, the conventional techniques have problems. Depending on the padding method applied, a reference block equivalent to that in the case where a reference picture is stored in the frame structure cannot be formed. It takes time longer than that in the case where a reference picture is stored in the frame structure.

The problems will be described by comparison between the case where a reference picture is stored in the frame structure and the case where a reference picture is stored in the field structure.

A case will be considered in which a reference picture is stored in the frame structure, the 2-line padding method is applied, and a reference block which is upwardly off from the uppermost top line of the reference picture is constructed only by the bottom line.

In this case, an area including a necessary number of a bottom line, the uppermost bottom line, and a copied uppermost bottom line is read from a frame memory together with a top line, the uppermost top line, and a copied uppermost top line, and is transferred, and only the necessary bottom lines are selectively used. In such a manner, a reference block constructed only by the bottom lines can be formed.

A configuration of forming a reference block by arranging the bottom line in the area of a reference picture and by arranging the copied uppermost bottom line on the outside of the area of the reference picture will be called a configuration X.

A case will be considered in which a reference picture is stored in the frame structure, the I-line padding method is applied, and a reference block which is upwardly off from the uppermost top line of the reference picture is constructed by the bottom line in the area of the reference picture and by the top line on the outside of the area of the reference picture.

In this case, an area including a necessary number of a bottom line and a copied uppermost top line is read from a frame memory together with a top line and the uppermost top line, and is transferred, and only the necessary bottom line and the copied uppermost top line are selectively used. In such a manner, a reference block constructed by the bottom line in the area of the reference picture and by the top line on the outside of the area of the reference picture can be formed.

A configuration of forming a reference block by arranging the bottom line in the area of a reference picture and by arranging the copied uppermost top line on the outside of the area of the reference picture will be called a configuration Y.

The cases where the reference picture is stored in the field structure will now be examined by comparison.

First, a case in which a reference picture is stored in the field structure and a reference block is constructed only by bottom lines will be considered. This case corresponds to the configuration X. Therefore, when the case is replaced with the case where the reference picture is stored in the frame structure, it corresponds to the case where the 2-line padding method is applied, and a reference block is constructed only by the bottom lines.

In the case where a reference picture is stored in the field structure, it is assumed that, basically, image data in the area of the reference picture is used.

Therefore, in the case of constructing a reference block only by bottom lines, an area including the uppermost bottom line and the bottom line in the area of the reference picture is read from the frame memory and transferred. With respect to a part on the outside of the area of the reference picture, image data is compensated by copying or address converting the read and transferred uppermost bottom line. In such a manner, a reference block constructed only by the bottom lines can be formed.

Therefore, in this case, even when a reference picture is stored in the field structure, no problem occurs. However, a problem occurs in the following case.

That is a case in which a reference block is constructed by bottom lines in the area of a reference picture and by top lines on the outside of the area of the reference picture when the reference picture is stored in the field structure. This case corresponds to the configuration Y. Therefore, When it is replaced with the case where a reference picture is stored in the frame structure, it is corresponds to the case in which the 1-line padding method is applied, and a reference block is constructed by bottom lines in the area of the reference picture and by top lines on the outside of the area of the reference picture.

In this case as well, the area including the uppermost bottom line and the bottom line in the area of the reference picture is read from the frame memory and transferred.

However, with respect to a part on the outside of the area of a reference picture, no image data of the necessary uppermost top line exists, so that image data cannot be read and transferred together with the above-described read area.

Therefore, it is impossible to form a reference block only by image data obtained by a single reading/transferring operation.

On the other hand, when the number of the image data reading/transferring operations is not limited to only one and the uppermost top line to be copied to the part on the outside of the area of the reference picture is read and transferred from a top line storing area separated from a bottom line storing area, by copying the uppermost top line, a reference block can be formed.

However, in the above forming method, the image data reading/transferring operation for forming a reference block has to be performed twice, so that the number of process steps increases, and transfer overhead for transferring the uppermost top line occurs. Since the number of cycles for the image data reading/transferring operation increases, power consumption also increases.

As described above, in the method of storing a reference picture in the field structure and forming a reference block, the process has to be changed according to the kind of a picture at the time of reading and transferring of image data and at the time of forming a reference block. Therefore, the number of processes in the process of decoding image data increases. The increase in the number of processes causes enlargement of the gate scale in process circuits such as a data transfer/write circuit and a predictive image data generating circuit, and increase in the power consumption.

When formation of a reference block requiring the image data reading/transferring operation twice is performed frequently, there is the possibility that decoding cannot be performed within required decoding time.

Therefore, an image decoding apparatus and method is in demand, which requires an image data reading/transferring operation only once for forming a reference block irrespective of the kind of a picture while employing the configuration of storing a reference picture in the field structure in order to reduce the amount of read data at the time of forming a reference block.

SUMMARY OF THE INVENTION

According to an image decoding apparatus of one aspect of the present invention, there is provided an image decoding apparatus comprising:

a frame memory capable of storing an image decoded in the past as a reference picture in order to use a part of the image decoded in the past as a reference block in a picture being presently decoded, the reference picture being stored in a field structure in which top lines in the reference picture are stored in a top area and bottom lines in the reference picture are stored in a bottom area separately;

a reference picture reconstructing device configured to selectively copy an uppermost top line or an uppermost bottom line in the reference picture to areas on the uppermost top line and the uppermost bottom line in the reference picture in the top area and the bottom area in the frame memory, and to selectively copy a lowermost top line or a lowermost bottom line in the reference picture to areas under the lowermost top line and the lowermost bottom line in the reference picture;

a reading/transferring device configured to read and transfer image data included in a rectangular area of the reference block defined in correspondence with motion vector information indicative of positional relation between a picture being presently decoded and the reference picture, in image data of the top line and the bottom line of the reference picture and the copied top and bottom lines; and a reference block forming device configured to form the reference block by using the transferred image data and, in the case where all of the rectangular area of the reference block cannot be formed only by the transferred image data, by copying or address-converting a part of the transferred image data.

According to an image decoding apparatus of another aspect of the present invention, there is provided an image decoding apparatus comprising:

a frame memory capable of storing an image decoded in the past as a reference picture in order to use a part of the image decoded in the past as a reference block in a picture being presently decoded, the reference picture being stored in a field structure in which top lines in the reference picture are stored in a top area and bottom lines in the reference picture are stored in a bottom area separately;

a reference picture reconstructing device configured to selectively copy an uppermost top line or an uppermost bottom line in the reference picture to areas on the uppermost top line and the uppermost bottom line in the reference picture in the top area and the bottom area in the frame memory, and to selectively copy a lowermost top line or a lowermost bottom line in the reference picture to areas under the lowermost top line and the lowermost bottom line in the reference picture;

a reading/transferring device configured to read and transfer image data included in a rectangular area of the reference block defined in correspondence with motion vector information indicative of positional relation between a picture being presently decoded and the reference picture, in image data of the top line and the bottom line of the reference picture and the copied top and bottom lines; and a reference block forming device configured to form the reference block by using the transferred image data and, in the case where all of the rectangular area of the reference block cannot be formed only by the transferred image data, by copying or address-converting a part of the transferred image data;

wherein in the case where the rectangular area of the reference block is upwardly off from the uppermost top line and the uppermost bottom line of the reference picture and the reference block is formed by the bottom line in the area of the reference picture and by the top line on the outside of the area of the reference picture, in the rectangular area of the reference block, or in the case where the rectangular area of the reference block is downwardly off from the lowermost top line and the lowermost bottom line of the reference picture and the reference block is formed by the top line in the area of the reference picture and by the bottom line on the outside of the area of the reference picture, in the rectangular area of the reference block, the reference picture reconstruction device copies and stores the uppermost top line in the reference picture to areas on the uppermost top line and the uppermost bottom line in the reference picture in the top area and the bottom area in the frame memory, and copies and stores the lowermost bottom line in the reference picture to areas under the lowermost top line and the lowermost bottom line in the reference picture in the top area and the bottom area in the frame memory.

According to an image decoding method of one aspect of the present invention, there is provided an image decoding method comprising:

storing an image decoded in the past as a reference picture into a frame memory, in a field structure in which top lines in the reference picture are stored in a top area and bottom lines in the reference picture are stored in a bottom area, in order to use a part of the image decoded in the past as a reference block in a picture being presently decoded; and selectively copying and storing an uppermost top line or an uppermost bottom line in the reference picture to areas on the uppermost top line and the uppermost bottom line in the reference picture in the top area and the bottom area in the frame memory, and selectively copying and storing a lowermost top line or a lowermost bottom line in the reference picture to areas under the lowermost top line and the lowermost bottom line in the reference picture in the top area and the bottom area in the frame memory.

DETAILED DESCRIPTION OF THE EMBODIMENTS

Embodiments of an image decoding apparatus and an image decoding method according to the present invention will be described hereinbelow with reference to the drawings.

An image decoding apparatus and an image decoding method as an embodiment of the present invention employ a configuration that areas for storing lines to be padded according to the kind of a reference picture for forming a reference block are provided on the uppermost line and under the lowermost line of the reference picture in the top area and the bottom area of a frame memory for storing the reference picture in the field structure.

Figure 1:
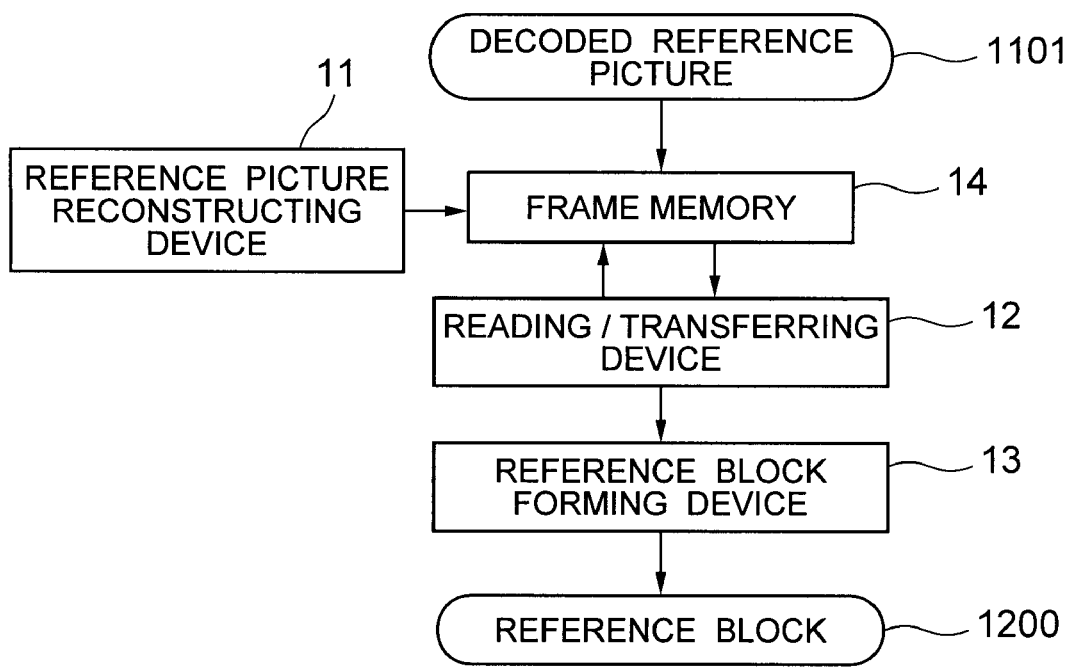
FIG. 1 is a block diagram showing the configuration of an image decoding apparatus as an embodiment of the present invention.

FIG. 1 is a block diagram showing the configuration of an image decoding apparatus as an embodiment of the present invention enabling an area configuration of a frame memory and formation of a reference block as described above.

The image decoding apparatus as an embodiment of the present invention has a frame memory 14 for storing image data of a decoded reference picture 1101, a reference picture reconstructing device 11 for reconstructing image data of the decoded reference picture 1101 and storing the reconstructed image data to the frame memory 14, a reading/transferring device 12 for reading and transferring the reconstructed image data in a reference block corresponding area in the reference picture 1101, and a reference block forming device 13 for forming a reference block 1200 by using the transferred image data in the reference block corresponding area.

When each of the components of the image decoding apparatus as an embodiment of the invention plays a predetermined function, the area configuration of the frame memory 14 and formation of the reference block 1200 as described above can be achieved. The reference block 1200 includes reference blocks 1201 and 1202 to be described later.

The functions and operations of the components of the image decoding apparatus as an embodiment of the invention will be concretely described.

Figure 2:
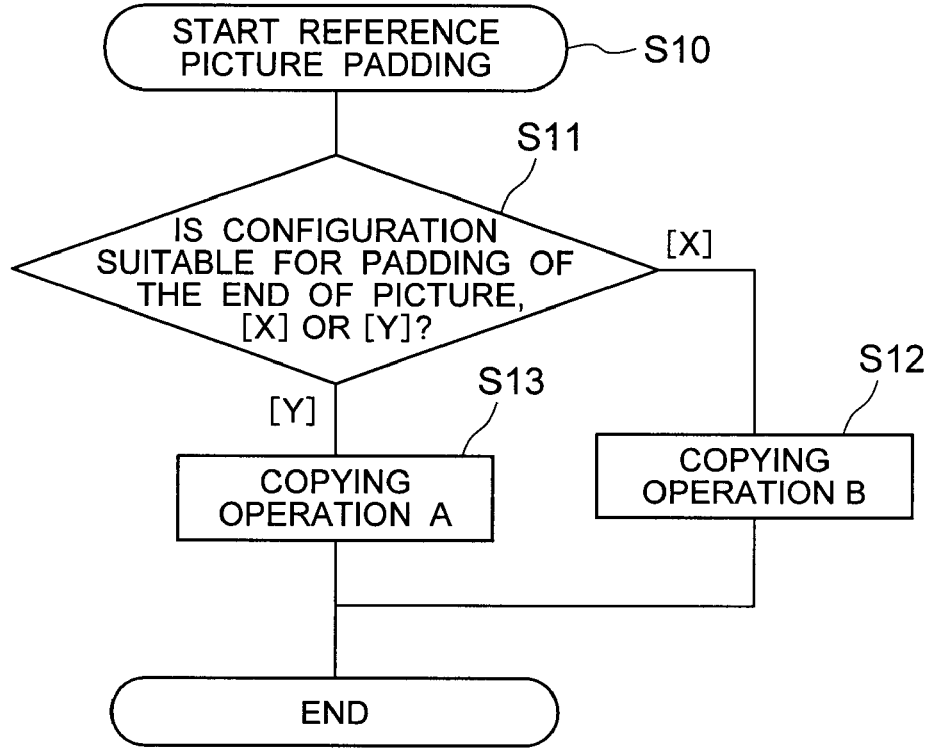
FIG. 2 is a flowchart showing operation procedure of the reference picture reconstructing device 11 provided for the image decoding apparatus as an embodiment of the invention.

FIG. 2 is a flowchart showing operation procedure of the reference picture reconstructing device 11 provided for the image decoding apparatus as an embodiment of the invention.

When padding of the reference picture 1101 starts (step S10), which one of the configurations X and Y is proper for padding of an end portion of the reference picture 1101 is determined (step S11).

As described above, the configuration X relates to the case where a reference block is constructed by arranging the bottom line in the area of a reference picture and by arranging the copied uppermost bottom line on the outside of the area of the reference picture. The configuration Y relates to the case where a reference block is constructed by arranging the bottom line in the area of a reference picture and by arranging the copied uppermost top line on the outside of the area of the reference picture.

In the case where it is determined that the configuration X is proper for padding of the end portions of the reference picture 1101, a copying operation B is executed (step S12). In the case where it is determined that the configuration Y is proper for padding of the end portions of the reference picture 1101, a copying operation A is executed (step S13).

First and second area configuration examples of a frame memory formed by the copying operations A and B will be concretely described.

Figure 3A:
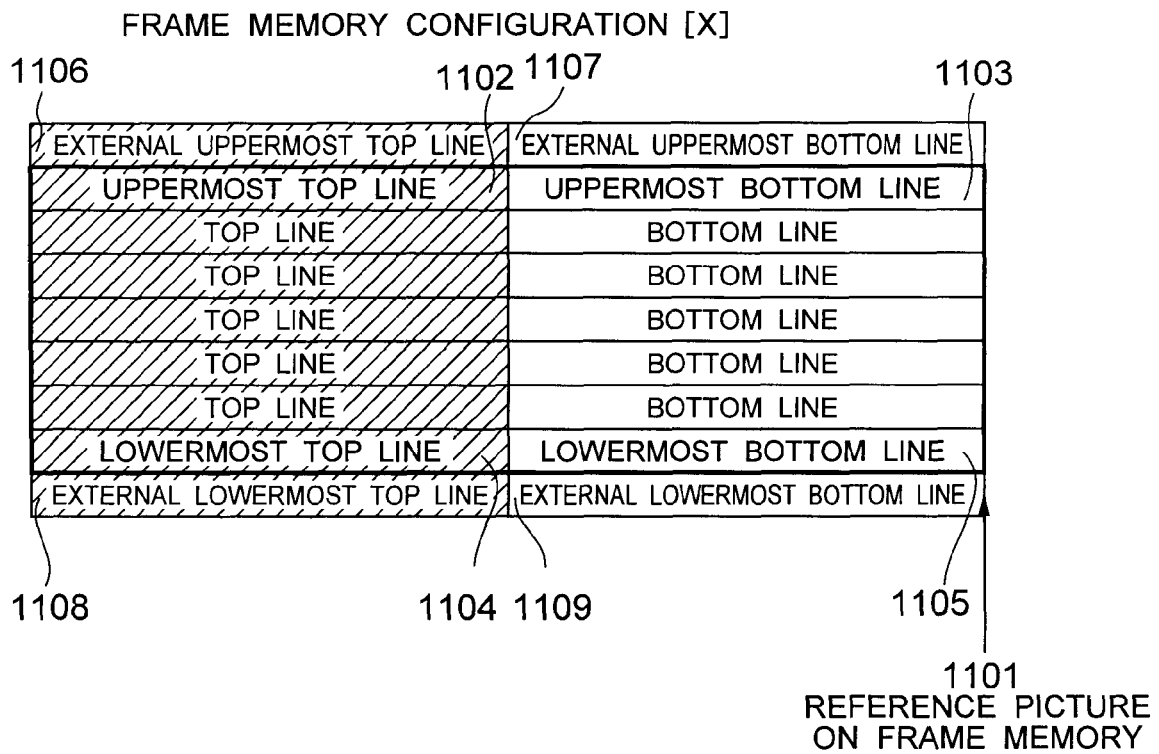
FIGS. 3A and 3B are explanatory diagrams schematically showing the first and second area configuration examples, respectively, of a frame memory in an image decoding apparatus and method of the first embodiment of the invention.
Figure 3B:
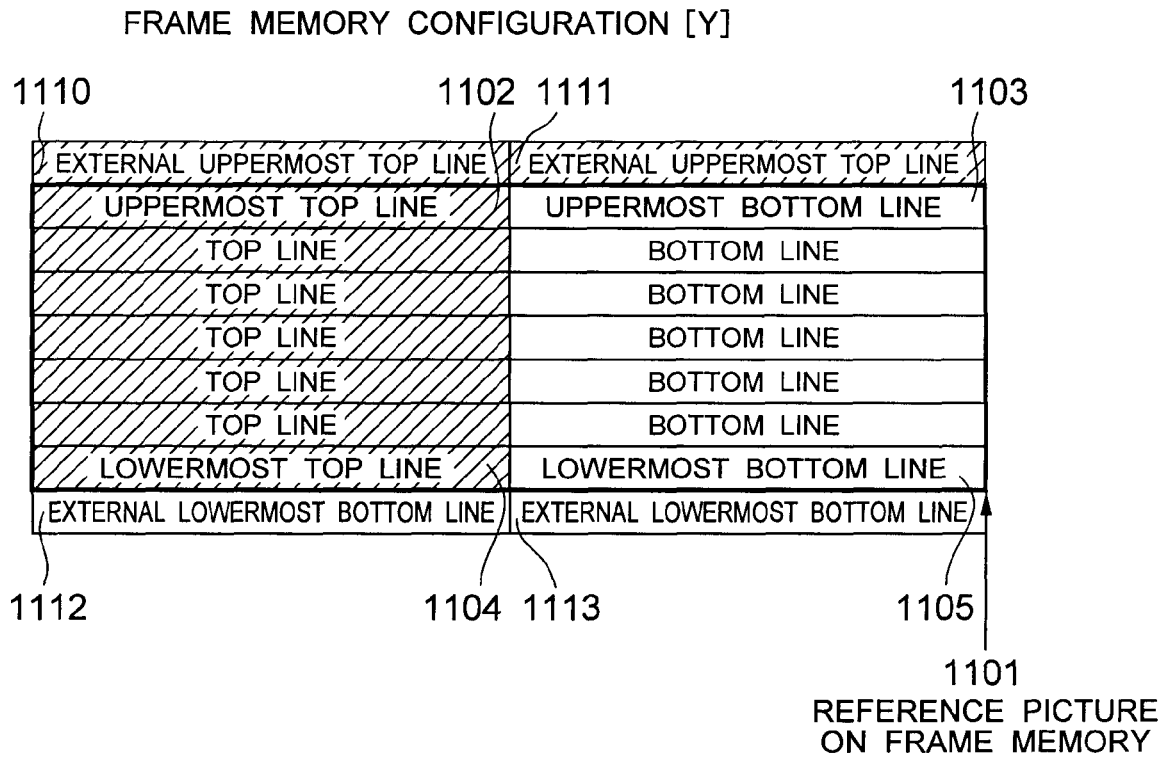

FIGS. 3A and 3B are explanatory diagrams schematically showing the first and second area configuration examples, respectively, of a frame memory in an image decoding apparatus and method of the first embodiment of the invention.

Image data of the reference picture 1101 is stored in the frame memory, with a field structure in which top lines are arranged in a top area and bottom lines are arranged in a bottom area separately as shown in FIGS. 3A and 3B.

The first area configuration example of the frame memory shown in FIG. 3A corresponds to the copying operation B.

In the case where it is determined in the step S11 that the configuration X is proper for the padding of the end portions of the reference picture 1101, the copying operation B is executed (step S12). Specifically, the uppermost top line and the uppermost bottom line are copied to the areas on the uppermost lines of the reference picture 1101 in the top area and the bottom area in the frame memory stored with the field structure of the reference picture 1101, thereby stored as an external uppermost top line and an external uppermost bottom line. In addition, the lowermost top line and the lowermost bottom line are copied to areas under the lowest lines of the reference picture 1101 in the top area and the bottom area in the frame memory, and are stored as an external lowest top line and an external lowest bottom line, respectively.

By the copying operation B, image data of the reference picture 1101 is reconstructed and stored in the frame memory 14.

In the first area configuration example of the frame memory shown in FIG. 3A obtained as a result, an external uppermost top line 1106 as a copy of the uppermost top line is stored in the area adjacent on the uppermost top line 1102 in the top area in the reference picture 1101 stored in the frame memory. An external uppermost bottom line 1107 as a copy of the uppermost bottom line is stored in the area adjacent on the uppermost bottom line 1103 in the bottom area. An external lowermost top line 1108 as a copy of the lowermost top line is stored in the area adjacent under the lowermost top line 1104 in the top area. An external lowest bottom line 1109 as a copy of the lowermost bottom line is stored in the area under the lowermost bottom line 1105 in the bottom area.

The first area configuration example of the frame memory shown in FIG. 3A corresponds to the configuration X in which a reference block is constructed by arranging the bottom line in the area of the reference picture and by arranging the copied uppermost bottom line on the outside of the area of the reference picture. Therefore, when the case is replaced with the case where the reference picture is stored with the frame structure, it is corresponds to the case in which the 2-line padding method is applied and the reference block is formed only by bottom lines.

On the other hand, in the case where it is determined in the step S11 that the configuration Y is proper for the padding of the end portions of the reference picture 1101, the copying operation A is executed (step S13). Specifically, the uppermost top line is copied to the areas on the uppermost lines of the reference picture 1101 in the top area and the bottom area in the frame memory stored with the field structure of the reference picture 1101, and stored as two external uppermost top lines. In addition, the lowermost bottom line is copied to the areas under the lowermost lines of the reference picture 1101 in the top area and the bottom area in the frame memory, and stored as two external lowermost bottom lines.

By the copying operation A, image data of the reference picture 1101 is reconstructed and stored in the frame memory 14.

In the second area configuration example of the frame memory shown in FIG. 3B obtained as a result, an external uppermost top line 1110 as a copy of the uppermost top line is stored in the area adjacent on the uppermost top line 1102 in the top area in the reference picture 1101 stored in the frame memory. An external uppermost top line 1111 as a copy of the uppermost top line is stored in the area adjacent on the uppermost bottom line 1103 in the bottom area. An external lowermost bottom line 1112 as a copy of the lowermost bottom line is stored in an area adjacent under the lowermost top line 1104 in the top area. An external lowermost bottom line 1113 as a copy of the lowermost bottom line is stored in an area adjacent under the lowermost bottom line 1105 in the bottom area.

The second area configuration example of the frame memory shown in FIG. 3B corresponds to the configuration Y in which the reference block is constructed by arranging the bottom line in the area of the reference picture and by arranging the copied uppermost top line on the outside of the area of the reference picture. Therefore, when the case is replaced with the case where the reference picture is stored with the frame structure, it is corresponds to the case in which the I-line padding method is applied and the reference block is formed by bottom lines in the area of the reference picture and by the top lines on the outside of the area of the reference picture.

Then, the operation procedure of the reference picture reconstructing device 11 is finished. The subsequent operation procedure is performed by the reading/transferring device 12.

Figure 4:
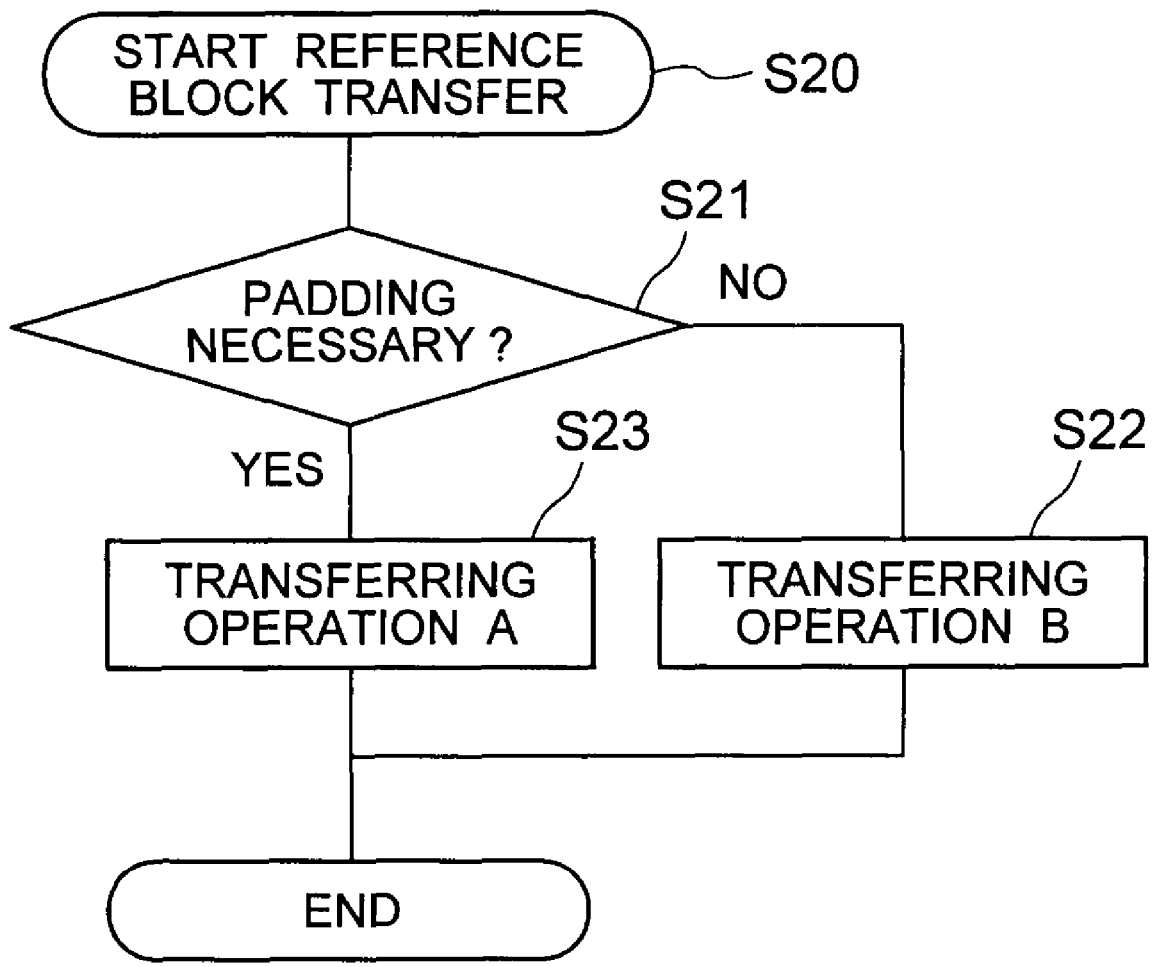
FIG. 4 is a flowchart showing the operation procedure of the reading/transferring device 12 provided for an image decoding apparatus as an embodiment of the invention.

FIG. 4 is a flowchart showing the operation procedure of the reading/transferring device 12 provided for an image decoding apparatus as an embodiment of the invention.

When transfer of image data of the reference block 1200 starts (step S20), whether padding is necessary for the transfer of image data of the reference block 1200 or not is determined on the basis of the position of the area in the reference block 1200 corresponding to motion vector information indicative of the positional relation between a picture being decoded at present and the reference picture (step S21).

When the padding is unnecessary for transfer of the image data of the reference block 1200, that is, when the area of the reference block 1200 corresponding to the motion vector information is completely included in the area of the original reference picture 1101 before reconstruction, a transferring operation B is executed (step S22). That is, only the image data in the area of the original reference picture 1101 before reconstruction is read from the rectangular area of the reference block 1200 corresponding to the motion vector information and is transferred.

On the other hand, when padding is necessary for the transfer of the image data of the reference block 1200, that is, when the area of the reference block 1200 corresponding to the motion vector information is not completely included in the area of the original reference picture 1101 before reconstruction but external lines copied to the areas on the uppermost and lowermost lines of the original reference picture 1101 by the reconstruction are included in the area of the reference block 1200, a transferring operation A is executed (step S23). That is, the image data in the area of the original reference picture 1101 and also the image data in the external lines are read from the rectangular area of the reference block 1200 corresponding to the motion vector information and is transferred. At this time, numerical value information indicative of how much the area of the reference block 1200 corresponding to the motion vector information lies off from the area of the original reference picture 1101 before reconstruction is also transferred together with the image data.

Figure 5A:
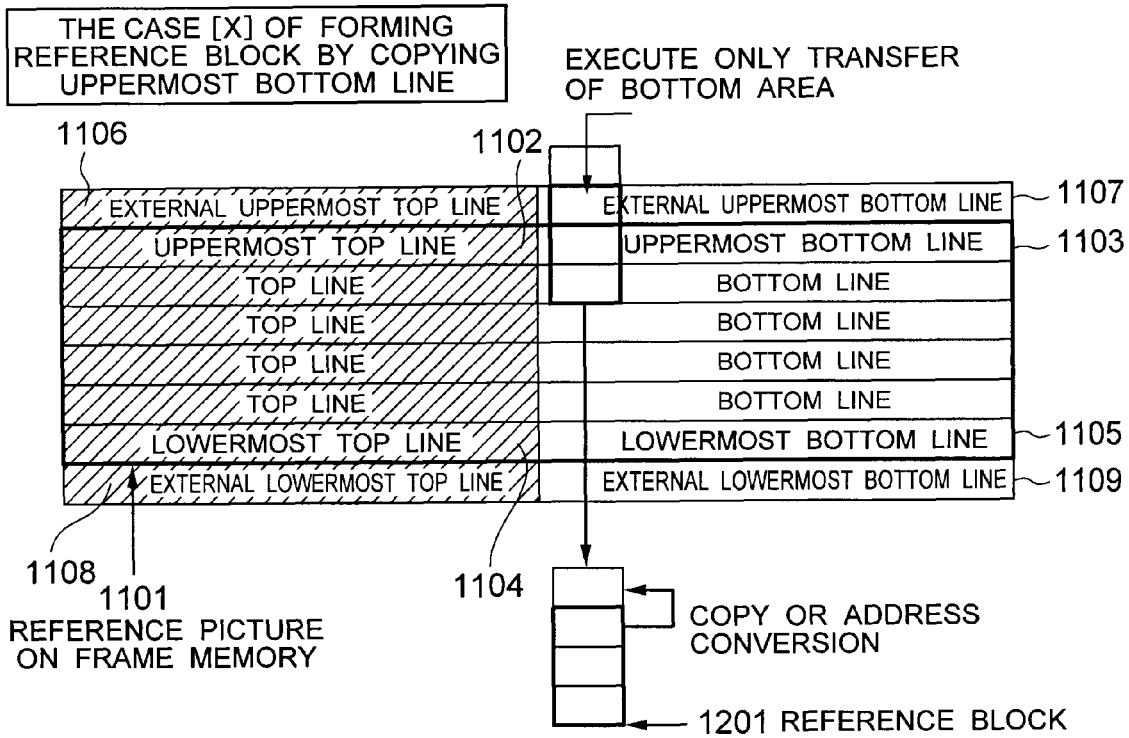
FIG. 5A is an explanatory diagram schematically showing a state where, when the first area configuration example of the frame memory in the image decoding apparatus and method as an embodiment of the invention is selected, a reference block is formed by arranging the bottom line in the area of the reference picture and by arranging the copied uppermost bottom line on the outside of the area of the reference picture.
Figure 5B:
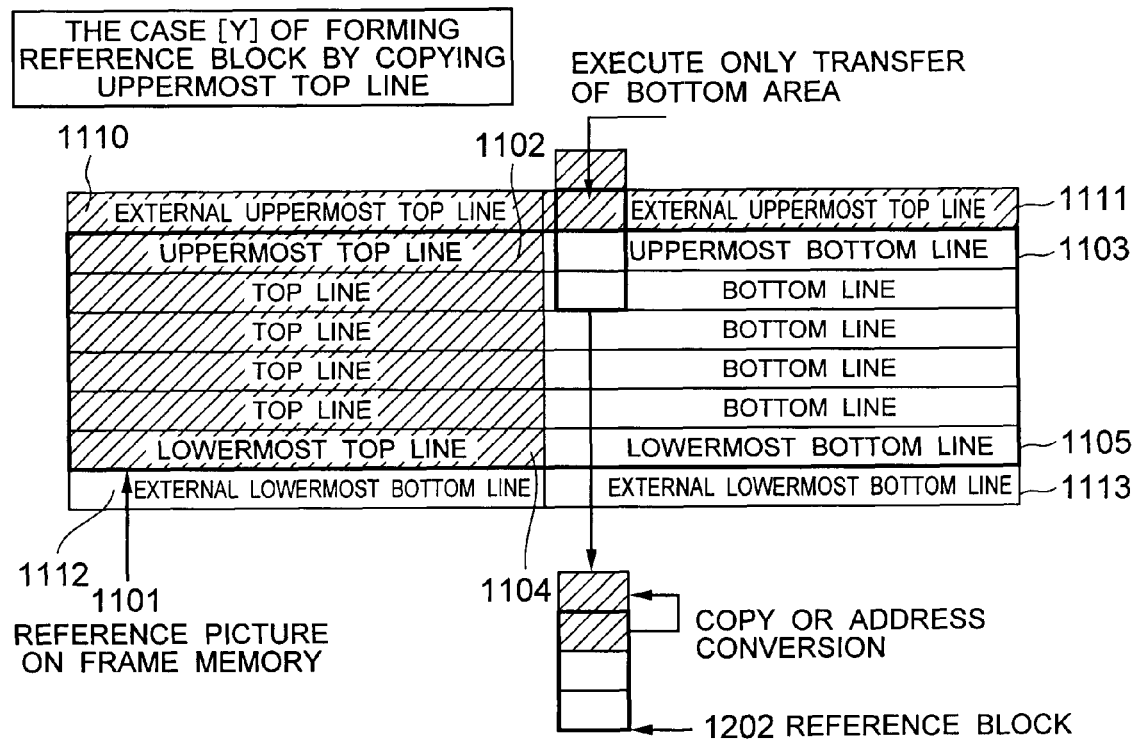
FIG. 5B is an explanatory diagram schematically showing a state where, when the second area configuration example of the frame memory in the image decoding apparatus and method as an embodiment of the invention is selected, a reference block is formed by arranging the bottom line in the area of the reference picture and by arranging the copied uppermost top line on the outside of the area of the reference picture.

FIG. 5A is an explanatory diagram schematically showing a state where, when the first area configuration example of the frame memory in the image decoding apparatus and method as an embodiment of the invention is selected, a reference block is formed by arranging the bottom line in the area of the reference picture and by arranging the copied uppermost bottom line on the outside of the area of the reference picture. FIG. 5B is an explanatory diagram schematically showing a state where, when the second area configuration example of the frame memory in the image decoding apparatus and method as an embodiment of the invention is selected, a reference block is formed by arranging the bottom line in the area of the reference picture and by arranging the copied uppermost top line on the outside of the area of the reference picture. FIGS. 5A and 5B correspond to FIGS. 3A and 3B, respectively. Each of the areas of reference blocks 1201 and 1202 shown in FIGS. 5A and 5B is defined in correspondence with motion vector information indicative of the positional relation between the picture being presently decoded and the reference picture 1101.

In the case where it is determined in the step S21 that padding is necessary for transfer of the image data of the reference block 1200, the area configuration of the frame memory is supposed to have either the first area configuration example shown in FIGS. 3A and 5A or the second area configuration example shown in FIGS. 3B and 5B. Therefore, irrespective of the area configuration of the frame memory, which is either the first area configuration or the second area configuration example, the transferring operation A is executed (step S23).

When the area configuration of the frame memory is the same as the first area configuration example, as shown in FIG. 5A, an area including the uppermost bottom line 1103 and the bottom line in the reference picture 1101 and the external uppermost bottom line 1107 stored as a copy of the uppermost bottom line 1103 is read from the frame memory and transferred.

When the area configuration of the frame memory is the same as the second area configuration example, as shown in FIG. 5B, an area including the uppermost bottom line 1103 and the bottom line in the reference picture 1101 and an external uppermost top line 1111 stored as a copy of the uppermost top line 1102 is read from the frame memory and transferred.

Irrespective of the area configuration of the frame memory, which is the first or second area configuration example, the area read from the frame memory is an area included in the reference block 1200 defined in correspondence with the motion vector information indicative of the positional relation between the picture being presently decoded and the reference picture 1101.

Then, the operation procedure of the reading/transferring device 12 is finished. The subsequent operation procedure is performed by the reference block forming device 13.

Figure 6:
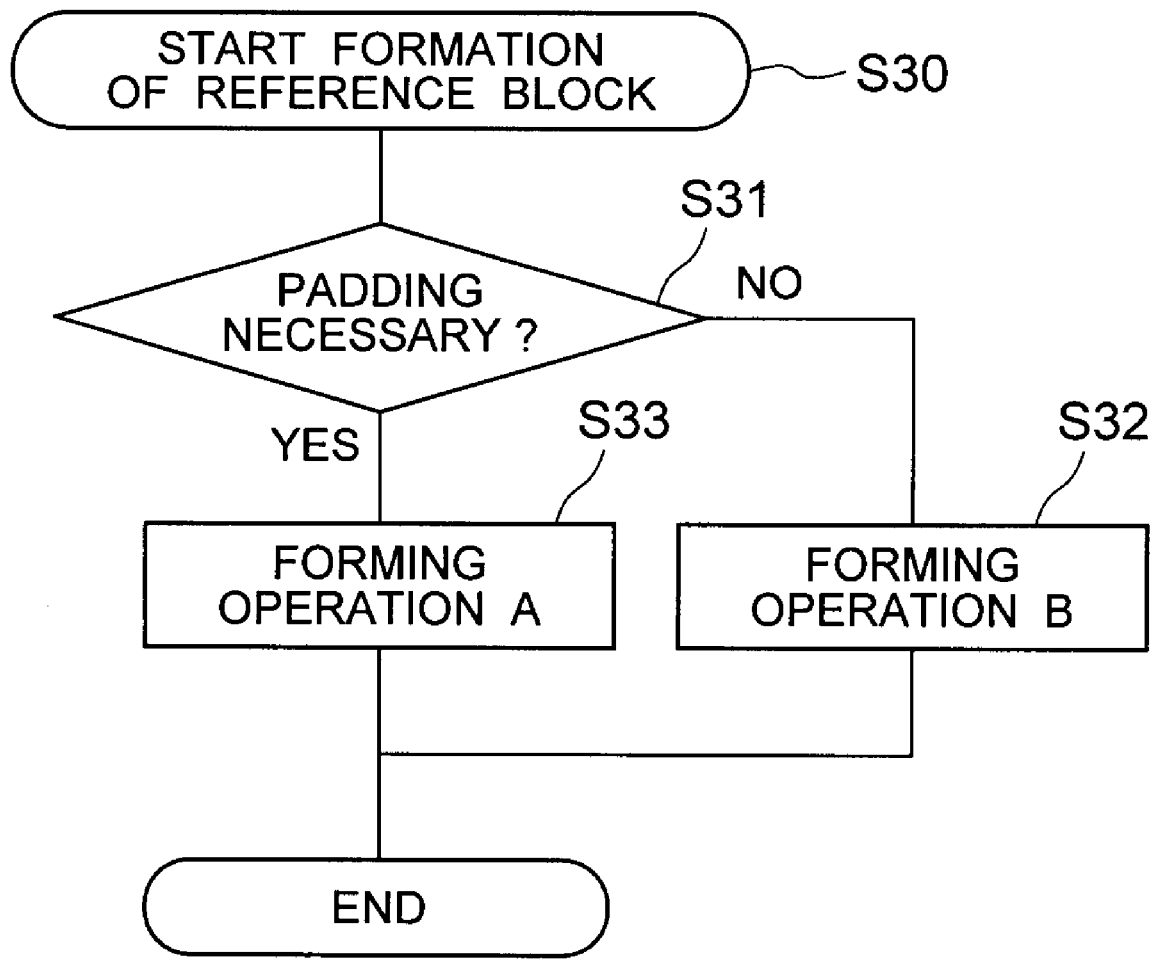
FIG. 6 is a flowchart showing the operation procedure of the reference block forming device 13 provided for the image decoding apparatus as an embodiment of the invention.

FIG. 6 is a flowchart showing the operation procedure of the reference block forming device 13 provided for the image decoding apparatus as an embodiment of the invention.

When formation of the reference block 1200 starts (step S30), whether padding is necessary for formation of the reference block 1200 or not is determined on the basis of the position of the area of the reference block 1200 corresponding to the motion vector information indicative of the positional relation between the picture presently being decoded and the reference picture (step S31).

When padding is unnecessary for formation of the reference block 1200, that is, when the area of the reference block 1200 corresponding to the motion vector information is completely included in the area of the original reference picture 1101 before reconstruction, a forming operation B is performed (step S32). That is, the reference block 1200 is formed by using only the image data in the area of the original reference picture 1101 before reconstruction which is transferred.

On the other hand, when padding is necessary for formation of the reference block 1200, that is, when the area of the reference block 1200 corresponding to the motion vector information is not completely included in the area of the original reference picture 1101 before reconstruction, but external lines copied to the areas on the uppermost lines and under the lowermost lines of the original reference picture 1101 by the reconstruction are included in the area of the reference block 1200, a forming operation A is executed (step S33). That is, the image data of the external lines transferred together with image data in the area of the original reference picture 1101 is copied or address-converted, thereby compensating image data of the necessary amount to form the reference block 1200.

When it is determined in the step S31 that padding is necessary for formation of the reference block 1200, the area configuration of the frame memory is supposed to have either the first area configuration example shown in FIGS. 3A and 5A or the second area configuration example shown in FIGS. 3B and 5B. Therefore, irrespective of the area configuration of the frame memory, which is either the first area configuration or the second area configuration example, the forming operation A is executed (step S33).

When the area configuration of the frame memory is the same as the first area configuration example, as shown in FIG. 5A, with respect to the area of the reference block 1201 and a part overlapped with the external uppermost bottom line 1107 in the external part of the reference picture 1101, the transferred image data of the external uppermost bottom line 1107 is used.

With respect to the area of the reference block 1201 and a part on the outside of the area of the external uppermost bottom line 1107 in the external part of the reference picture 1101, image data is compensated by copying or address-converting the transferred external uppermost bottom line 1107.

In such a manner, the reference block 1201 in FIG. 5A constructed only by the bottom lines can be formed.

Therefore, the formation of the reference block 1201 shown in FIG. 5A corresponds to the configuration X in which a reference block is constructed by arranging the bottom line in the area of the reference picture and by arranging the copied uppermost bottom line on the outside of the area of the reference picture. That is, when the case is replaced with the case where the reference picture is stored with the frame structure, it is corresponds to the case in which the 2-line padding method is applied and the reference block is formed only by bottom lines.

The example of FIG. 5A relates to the case where the reference block is upwardly off from the uppermost line of the reference picture. Also in the case where the reference block is downwardly off from the lowermost line of the reference picture, by preliminarily copying and storing lines as in the first area configuration example of the frame memory shown in FIG. 3A, a reference block can be formed by the same operation procedure.

When the area configuration of the frame memory is the same as the second area configuration example, as shown in FIG. 5B, with respect to the area of the reference block 1202 and a part overlapped with the external uppermost top line 1111 in the external part of the reference picture 1101, the transferred image data of the external uppermost top line 1111 is used.

With respect to the area of the reference block 1202 and a part on the outside of the area of the external uppermost top line 1111 in the external part of the reference picture 1101, image data is compensated by copying or address-converting the transferred external uppermost top line 1111.

In such a manner, the reference block 1202 constructed by arranging the bottom line in the area of the reference picture 1101 and by arranging the copied uppermost top line on the outside of the area of the reference picture 1101 can be formed.

Therefore, the formation of the reference block 1202 shown in FIG. 5B corresponds to the configuration Y in which a reference block is constructed by arranging the bottom line in the area of the reference picture and by arranging the copied uppermost top line on the outside of the area of the reference picture. That is, when the case is replaced with the case where the reference picture is stored with the frame structure, it is corresponds to the case in which the 1-line padding method is applied and the reference block is constructed by the bottom line in the area of the reference picture and by the top line on the outside of the area of the reference picture.

In the case of the reference block having the configuration Y, with the conventional technique, there are problems such that a reference block equivalent to that in the case where the reference picture is stored in the frame structure cannot be formed, or it takes time longer than the case where the reference picture is stored in the frame structure.

In the image decoding apparatus and method as an embodiment of the invention, at the point when it is determined that a reference block is to be formed by arranging the bottom line in the area of the reference picture and by arranging the copied uppermost top line on the outside of the area of the reference picture, two external uppermost top lines each as a copy of the uppermost top line are stored in the area on the uppermost line of the reference picture in the top and bottom areas and two external lowermost bottom lines each as a copy of the lowermost bottom line are stored under the lowermost line of the reference picture in the top and bottom areas. As a result, only by a single transfer of the image data in the rectangular area in the bottom area and copying or address converting the external uppermost top line, high-speed formation of the reference block in the configuration Y can be realized.

The example of FIG. 5B relates to the case where the reference block is upwardly off from the uppermost line of the reference picture. The case where the reference block is downwardly off from the lowermost line of the reference picture corresponds to a configuration Y' in which a reference block is formed by arranging the top line in the area of the reference picture and by arranging the copied lowermost bottom line on the outside of the area of the reference picture. Consequently, by preliminarily copying and storing lines as in the second area configuration example of the frame memory shown in FIG. 3B, a reference block can be formed by the same operation procedure. That is, the configuration Y' can be handled as well as the configuration Y.

A normal interpolating operation is also performed at the time of forming the reference blocks 1201 and 1202.

Then, the operation procedure of the reference block forming device 13 is finished and formation of the reference block 1200 (the reference blocks 1201 and 1202) completes.

As described above, in the image decoding apparatus and method as an embodiment of the invention, image data of proper lines according to the kind of a reference picture is selected and preliminarily copied and stored on the uppermost line and under the lowermost line of the reference picture, and the read/transfer area of image data is formed as a rectangular area. With the configuration, the subsequent image data reading/transferring operation and the image data copying operation or address conversion operation can be performed uniformly irrespective of the kind of the reference picture. Thus, high-speed formation of a reference block can be realized.

That is, in the image decoding apparatus and method as an embodiment of the invention, the reading and transferring operation of image data for forming a reference block is performed only once. Therefore, increase in the number of processes in the step of decoding image data can be suppressed. The situation that decoding cannot be performed within required decoding time can be also avoided, and increase in the power consumption can be also suppressed. Since increase in the number of processes in the step of decoding image data is suppressed, enlargement of the gate scale in a processing circuit can be also prevented.

What is claimed is:

1. An image decoding apparatus comprising:
    a frame memory capable of storing an image decoded in the past as a reference picture in order to use a part of the image decoded in the past as a reference block in a picture being presently decoded, the reference picture being stored in a field structure in which top lines in the reference picture are stored in a top area and bottom lines in the reference picture are stored in a bottom area separately;
    a reference picture reconstructing device configured to selectively copy and store an uppermost top line or an uppermost bottom line in the reference picture to areas on the uppermost top line and the uppermost bottom line in the reference picture in the top area and the bottom area respectively in the frame memory, and to selectively copy and store a lowermost top line or a lowermost bottom line in the reference picture to areas under the lowermost top line and the lowermost bottom line in the reference picture in the top area and the bottom area respectively in the frame memory;
    a reading/transferring device configured to read and transfer image data included in a rectangular area of the reference block defined in correspondence with motion vector information indicative of positional relation between a picture being presently decoded and the reference picture, in image data of the top line and the bottom line of the reference picture and the copied top and bottom lines; and a reference block forming device configured to form the reference block by using the transferred image data and, in the case where all of the rectangular area of the reference block cannot be formed only by the transferred image data, by copying or address-converting a part of the transferred image data.

2. The image decoding apparatus according to claim 1, wherein in the case of forming the reference block only by the bottom lines in the reference picture, the reference picture reconstructing device copies and stores the uppermost top line and the uppermost bottom line of the reference picture to areas on the uppermost top line and the uppermost bottom line of the reference picture in the top area and the bottom area of the frame memory, respectively, and copies and stores the lowermost top line and the lowermost bottom line in the reference picture to areas under the lowermost top line and the lowermost bottom line of the reference picture, respectively.

3. The image decoding apparatus according to claim 2, wherein in the case where the rectangular area of the reference block defined in correspondence with the motion vector information includes the uppermost top line and the uppermost bottom line of the reference picture copied in the areas on the uppermost top line and the uppermost bottom line of the reference picture, or in the case where the rectangular area includes the lowermost top line and the lowermost bottom line of the reference picture copied in the areas under the lowermost top line and the lowermost bottom line of the reference picture, the reading/transferring device reads and transfers the image data included in the rectangular area in the reference block, which is image data in the area of the reference picture and image data copied on the outside of the area of the reference picture.

4. The image decoding apparatus according to claim 3, wherein in the case where the rectangular area of the reference block defined in correspondence with the motion vector information includes the uppermost top line and the uppermost bottom line of the reference picture copied in the areas on the uppermost top line and the uppermost bottom line of the reference picture, or in the case where the rectangular area includes the lowermost top line and the lowermost bottom line of the reference picture copied in the areas under the lowermost top line and the lowermost bottom line of the reference picture, the reference block forming device forms the reference block by compensating image data by a necessary amount by copying or address-converting the image data included in the rectangular area in the reference block, which is the copied image data on the outside of the area of the reference picture, in the transferred image data.

5. The image decoding apparatus according to claim 1, wherein in the case of forming the reference block only by the bottom lines in the reference picture, the reference picture reconstructing device copies and stores the uppermost top line and the uppermost bottom line of the reference picture to areas on the uppermost top line and the uppermost bottom line of the reference picture in the top area and the bottom area of the frame memory, respectively, and copies and stores the lowermost top line and the lowermost bottom line in the reference picture to areas under the lowermost top line and the lowermost bottom line of the reference picture, respectively, and, in the case where the rectangular area of the reference block is upwardly off from the uppermost top line and the uppermost bottom line of the reference picture and the reference block is formed by the bottom line in the area of the reference picture and by the top line on the outside of the area of the reference picture, in the rectangular area of the reference block, or in the case where the rectangular area of the reference block is downwardly off from the lowermost top line and the lowermost bottom line of the reference picture and the reference block is formed by the top line in the area of the reference picture and by the bottom line on the outside of the area of the reference picture, in the rectangular area of the reference block, the reference picture reconstruction device copies and stores the uppermost top line in the reference picture to areas on the uppermost top line and the uppermost bottom line in the reference picture in the top area and the bottom area in the frame memory, and copies and stores the lowermost bottom line in the reference picture to areas under the lowermost top line and the lowermost bottom line in the reference picture in the top area and the bottom area in the frame memory.

6. The image decoding apparatus according to claim 5, wherein in the case where the rectangular area of the reference block defined in correspondence with the motion vector information includes the uppermost top line and the uppermost bottom line of the reference picture copied in the areas on the uppermost top line and the uppermost bottom line of the reference picture, or in the case where the rectangular area includes the lowermost top line and the lowermost bottom line of the reference picture copied in the areas under the lowermost top line and the lowermost bottom line of the reference picture, the reading/transferring device reads and transfers the image data included in the rectangular area in the reference block, which is image data in the area of the reference picture and image data copied on the outside of the area of the reference picture.

7. The image decoding apparatus according to claim 6, wherein in the case where the rectangular area of the reference block defined in correspondence with the motion vector information includes the uppermost top line and the uppermost bottom line of the reference picture copied in the areas on the uppermost top line and the uppermost bottom line of the reference picture, or in the case where the rectangular area includes the lowermost top line and the lowermost bottom line of the reference picture copied in the areas under the lowermost top line and the lowermost bottom line of the reference picture, the reference block forming device forms the reference block by compensating image data by a necessary amount by copying or address-converting the image data included in the rectangular area in the reference block, which is the copied image data on the outside of the area of the reference picture, in the transferred image data.

8. The image decoding apparatus according to claim 1, wherein the frame memory is an SDRAM.

9. An image decoding apparatus comprising:
a frame memory capable of storing an image decoded in the past as a reference picture in order to use a part of the image decoded in the past as a reference block in a picture being presently decoded, the reference picture being stored in a field structure in which top lines in the reference picture are stored in a top area and bottom lines in the reference picture are stored in a bottom area separately;

a reference picture reconstructing device configured to selectively copy an uppermost top line or an uppermost bottom line in the reference picture to areas on the uppermost top line and the uppermost bottom line in the reference picture in the top area and the bottom area in the frame memory, and to selectively copy a lowermost top line or a lowermost bottom line in the reference picture to areas under the lowermost top line and the lowermost bottom line in the reference picture;

a reading/transferring device configured to read and transfer image data included in a rectangular area of the reference block defined in correspondence with motion vector information indicative of positional relation between a picture being presently decoded and the reference picture, in image data of the top line and the bottom line of the reference picture and the copied top and bottom lines; and a reference block forming device configured to form the reference block by using the transferred image data and, in the case where all of the rectangular area of the reference block cannot be formed only by the transferred image data, by copying or address-converting a part of the transferred image data;

wherein in the case where the rectangular area of the reference block is upwardly off from the uppermost top line and the uppermost bottom line of the reference picture and the reference block is formed by the bottom line in the area of the reference picture and by the top line on the outside of the area of the reference picture, in the rectangular area of the reference block, or in the case where the rectangular area of the reference block is downwardly off from the lowermost top line and the lowermost bottom line of the reference picture and the reference block is formed by the top line in the area of the reference picture and by the bottom line on the outside of the area of the reference picture, in the rectangular area of the reference block, the reference picture reconstruction device copies and stores the uppermost top line in the reference picture to areas on the uppermost top line and the uppermost bottom line in the reference picture in the top area and the bottom area in the frame memory, and copies and stores the lowermost bottom line in the reference picture to areas under the lowermost top line and the lowermost bottom line in the reference picture in the top area and the bottom area in the frame memory.

10. The image decoding apparatus according to claim 9, wherein in the case where the rectangular area of the reference block defined in correspondence with the motion vector information includes the uppermost top line and the uppermost bottom line of the reference picture copied in the areas on the uppermost top line and the uppermost bottom line of the reference picture, or in the case where the rectangular area includes the lowermost top line and the lowermost bottom line of the reference picture copied in the areas under the lowermost top line and the lowermost bottom line of the reference picture, the reading/transferring device reads and transfers the image data included in the rectangular area in the reference block, which is image data in the area of the reference picture and image data copied on the outside of the area of the reference picture.

11. The image decoding apparatus according to claim 10, wherein in the case where the rectangular area of the reference block defined in correspondence with the motion vector information includes the uppermost top line and the uppermost bottom line of the reference picture copied in the areas on the uppermost top line and the uppermost bottom line of the reference picture, or in the case where the rectangular area includes the lowermost top line and the lowermost bottom line of the reference picture copied in the areas under the lowermost top line and the lowermost bottom line of the reference picture, the reference block forming device forms the reference block by compensating image data by a necessary amount by copying or address-converting the image data included in the rectangular area in the reference block, which is the copied image data on the outside of the area of the reference picture, in the transferred image data.

12. An image decoding method comprising:

storing an image decoded in the past as a reference picture into a frame memory, in a field structure in which top lines in the reference picture are stored in a top area and bottom lines in the reference picture are stored in a bottom area, in order to use a part of the image decoded in the past as a reference block in a picture being presently decoded;

selectively copying and storing an uppermost top line or an uppermost bottom line in the reference picture to areas on the uppermost top line and the uppermost bottom line in the reference picture in the top area and the bottom area respectively in the frame memory, and selectively copying and storing a lowermost top line or a lowermost bottom line in the reference picture to areas under the lowermost top line and the lowermost bottom line in the reference picture in the top area and the bottom area respectively in the frame memory;

reading and transferring image data included in a rectangular area of the reference block defined in correspondence with motion vector information indicative of positional relation between a picture being presently decoded and the reference picture, in image data of the top line and the bottom line of the reference picture and the copied top and bottom lines; and forming the reference block by using the transferred image data and, in the case where all of the rectangular area of the reference block cannot be formed only by the transferred image data, by copying or address-converting a part of the transferred image data.

13. The image decoding method according to claim 12, further comprising:

in the case of forming the reference block only by the bottom lines in the reference picture, copying and storing the uppermost top line and the uppermost bottom line of the reference picture to areas on the uppermost top line and the uppermost bottom line of the reference picture in the top area and the bottom area of the frame memory, and copying and storing the lowermost top line and the lowermost bottom line in the reference picture to areas under the lowermost top line and the lowermost bottom line of the reference picture in the top area and the bottom area of the frame memory.

14. The image decoding method according to claim 13, further comprising:

in the case where the rectangular area of the reference block defined in correspondence with the motion vector information includes the uppermost top line and the uppermost bottom line of the reference picture copied in the areas on the uppermost top line and the uppermost bottom line of the reference picture, or in the case where the rectangular area includes the lowermost top line and the lowermost bottom line of the reference picture copied in the areas under the lowermost top line and the lowermost bottom line of the reference picture, reading and transferring the image data included in the rectangular area in the reference block, which is image data in the area of the reference picture and image data copied on the outside of the area of the reference picture.

15. The image decoding method according to claim 14, further comprising:

in the case where the rectangular area of the reference block defined in correspondence with the motion vector information includes the uppermost top line and the uppermost bottom line of the reference picture copied in the areas on the uppermost top line and the uppermost bottom line of the reference picture, or in the case where the rectangular area includes the lowermost top line and the lowermost bottom line of the reference picture copied in the areas under the lowermost top line and the lowermost bottom line of the reference picture, forming the reference block by compensating image data by a necessary amount by copying or address-converting the image data included in the rectangular area in the reference block, which is the copied image data on the outside of the area of the reference picture, in the transferred image data.

16. The image decoding method according to claim 12, further comprising:
in the case where the rectangular area of the reference block is upwardly off from the uppermost top line and the uppermost bottom line of the reference picture and the reference block is formed by the bottom line in the area of the reference picture and by the top line on the outside of the area of the reference picture, in the rectangular area of the reference block, or in the case where the rectangular area of the reference block is downwardly off from the lowermost top line and the lowermost bottom line of the reference picture and the reference block is formed by the top line in the area of the reference picture and by the bottom line on the outside of the area of the reference picture, in the rectangular area of the reference block, copying and storing the uppermost top line in the reference picture to areas on the uppermost top line and the uppermost bottom line in the reference picture in the top area and the bottom area in the frame memory, and copying and storing the lowermost bottom line in the reference picture to areas under the lowermost top line and the lowermost bottom line in the reference picture in the top area and the bottom area in the frame memory.

17. The image decoding method according to claim 16, further comprising:
in the case where the rectangular area of the reference block defined in correspondence with the motion vector information includes the uppermost top line and the uppermost bottom line of the reference picture copied in the areas on the uppermost top line and the uppermost bottom line of the reference picture, or in the case where the rectangular area includes the lowermost top line and the lowermost bottom line of the reference picture copied in the areas under the lowermost top line and the lowermost bottom line of the reference picture, reading and transferring the image data included in the rectangular area in the reference block, which is image data in the area of the reference picture and image data copied on the outside of the area of the reference picture.

18. The image decoding method according to claim 17, further comprising:
in the case where the rectangular area of the reference block defined in correspondence with the motion vector information includes the uppermost top line and the uppermost bottom line of the reference picture copied in the areas on the uppermost top line and the uppermost bottom line of the reference picture, or in the case where the rectangular area includes the lowermost top line and the lowermost bottom line of the reference picture copied in the areas under the lowermost top line and the lowermost bottom line of the reference picture, forming the reference block by compensating image data by a necessary amount by copying or address-converting the image data included in the rectangular area in the reference block, which is the copied image data on the outside of the area of the reference picture, in the transferred image data.

19. The image decoding method according to claim 12, wherein the frame memory is an SDRAM.

\* \* \* \* \*